United States Patent
Nunes et al.

(10) Patent No.: US 11,548,650 B2
(45) Date of Patent: Jan. 10, 2023

(54) HYBRID AIRSHIP

(71) Applicants: Brendon G. Nunes, Ajax (CA); Florentin Christoph von Frankenberg, Walkerton (CA)

(72) Inventors: Brendon G. Nunes, Ajax (CA); Florentin Christoph von Frankenberg, Walkerton (CA)

(*) Notice: Subject to any disclaimer, the term of this patent is extended or adjusted under 35 U.S.C. 154(b) by 686 days.

(21) Appl. No.: 15/530,528

(22) Filed: Jan. 25, 2017

(65) Prior Publication Data
US 2018/0022461 A1  Jan. 25, 2018

Related U.S. Application Data

(60) Provisional application No. 62/388,724, filed on Feb. 5, 2016.

(51) Int. Cl.
| | | |
|---|---|---|
| *B64B 1/32* | (2006.01) | |
| *B64D 27/24* | (2006.01) | |
| *B64B 1/34* | (2006.01) | |
| *B64C 39/02* | (2006.01) | |
| *B64D 27/02* | (2006.01) | |

(52) U.S. Cl.
CPC .............. *B64D 27/24* (2013.01); *B64B 1/32* (2013.01); *B64B 1/34* (2013.01); *B64C 39/024* (2013.01); *B64C 2201/00* (2013.01); *B64C 2201/022* (2013.01); *B64C 2201/027* (2013.01); *B64C 2201/042* (2013.01); *B64C 2201/101* (2013.01); *B64C 2201/108* (2013.01); *B64C 2201/162* (2013.01); *B64C 2201/165* (2013.01); *B64D 2027/026* (2013.01); *Y02T 50/60* (2013.01)

(58) Field of Classification Search
CPC ......... B64B 1/32; B64B 1/34; B64B 2201/00; B64B 2201/022; B64B 2201/027; B64B 2201/042; B64B 2201/101; B64B 2201/108; B64B 2201/165; B64B 2201/06; B64B 2201/066
See application file for complete search history.

(56) References Cited

U.S. PATENT DOCUMENTS 4,786,008 A   11/1988  Corbett
4,995,572 A *  2/1991  Piasecki .................... B64B 1/50
                                                         244/140

(Continued)

FOREIGN PATENT DOCUMENTS

DE     102008014404 A1   10/2009

OTHER PUBLICATIONS

Online Oxford English Dictionary (Appendices A and B).*

(Continued)

*Primary Examiner* — Philip J Bonzell

(57) ABSTRACT

A hybrid airship (drone, UAV) capable of significantly extended flight times can use one of two technologies, or both together. The first technology uses a combination of a lifting gas (such as hydrogen or helium) in a central volume or balloon and multirotor technology for lift and maneuvering. The second technology equips the airship with an on board generator to charge the batteries during flight for extended flight operations, with an internal combustion engine (such as a high power to weight ratio gas turbine engine) driving the generator. A quadcopter or other multicopter configuration is desirable.

11 Claims, 7 Drawing Sheets

(56) References Cited

U.S. PATENT DOCUMENTS

| | | | |
|---|---|---|---|
| 6,286,783 B1 * | 9/2001 | Kuenkler | B63H 5/125 |
| | | | 244/26 |
| 6,467,724 B2 * | 10/2002 | Kuenkler | B63H 5/125 |
| | | | 244/17.25 |
| 6,966,523 B2 * | 11/2005 | Colting | B64B 1/02 |
| | | | 244/30 |
| 7,055,777 B2 * | 6/2006 | Colting | B64B 1/02 |
| | | | 244/30 |
| 7,364,114 B2 | 4/2008 | Wobben | |
| 7,438,261 B2 * | 10/2008 | Porter | B64B 1/06 |
| | | | 244/123.11 |
| 7,866,601 B2 | 1/2011 | Balaskovic | |
| 7,913,948 B2 * | 3/2011 | Porter | B64B 1/06 |
| | | | 244/126 |
| 8,128,019 B2 | 3/2012 | Annati et al. | |
| 8,544,788 B1 | 10/2013 | Capper | |
| 8,894,002 B2 * | 11/2014 | Goelet | B64B 1/005 |
| | | | 244/26 |
| 8,899,514 B2 * | 12/2014 | Goelet | B64B 1/005 |
| | | | 244/26 |
| 9,376,208 B1 | 6/2016 | Gentry | |
| 9,751,625 B2 | 9/2017 | Phan et al. | |
| 9,828,082 B2 * | 11/2017 | Goelet | B64B 1/005 |
| 9,852,644 B2 * | 12/2017 | Salnikov | A01B 79/02 |
| 10,000,293 B2 | 6/2018 | Hamel et al. | |
| 2009/0145998 A1 | 6/2009 | Salyer | |
| 2012/0234964 A1 | 9/2012 | Heppe | |
| 2015/0285165 A1 * | 10/2015 | Steinwandel | B64D 27/02 |
| | | | 244/55 |
| 2016/0137304 A1 | 5/2016 | Phan et al. | |
| 2016/0307448 A1 | 10/2016 | Salnikov et al. | |
| 2017/0233055 A1 * | 8/2017 | Brutoco | B64B 1/06 |
| | | | 244/30 |

OTHER PUBLICATIONS

Www.aerobotx.net/blog; "First CAD design for ObliX!", Jul. 19, 2014.

Https://www.yankodesign.com/2017/01/10/a-drone-you-can-drive/; Turner; A Drone You Can Drive; Jan. 10, 2017; seven pages.

LaunchPoint Develops High Specific Power Genset for UAVs; Apr. 13, 2015, http://www/launchpnt.com/news/news/topic/uav-propulsion.

* cited by examiner

HYBRID AIRSHIP

CROSS-REFERENCE TO RELATED APPLICATION

This application claims the benefit of U.S. Provisional Application Ser. 62/388,724 filed Feb. 5, 2016, the disclosure of which is hereby incorporated by reference herein.

BACKGROUND AND SUMMARY OF THE INVENTION

The invention relates to a hybrid airship (drone, UAV) which is capable of significantly extended flight times. This can be accomplished in two different ways, or the two may be combined together to provide even longer flight times. The first technology uses a combination of a lifting gas (such as hydrogen or helium) and multirotor technology for lift and maneuvering. The second technology equips the airship (drone, UAV) with an on board generator to charge the batteries during flight for extended flight operations, with an internal combustion engine driving the generator.

In the first technology, a quadcopter includes an ellipsoid shaped volume or "balloon" for retaining the lifting gas in the center thereof. The balloon may be made of any suitable material as long as it is lightweight and capable of containing helium or the like. The lighter-than-air gas contained within the ellipsoid balloon provides the majority of the lift while four (or more) motors/propellers use standard quadcopter methodology (powered by one or more batteries, as is conventional) to provide additional lift and to maneuver, including to facilitate descent. This is fundamentally different than a conventional airship or dirigible because in those scenarios none of the lift is intended to be provided by the propulsion system.

In the second technology the airship is equipped with an on board generator, and a powered device for driving the generator such as an internal combustion engine, to provide power to charge the batteries. It is typically not feasible to use an internal combustion engine alone to power a UAV because conventional quadcopters and the like depend on a microprocessor system to fly and control the craft and three or more electric motors to power the flight of the craft. An electronic controller board uses a series of microprocessors, complex hardware, software, programming, and gyros to keep the craft flying. The electronic controller which is central to all of these machines maintains flight through changes in RPM and torque of the motors to maintain flight. Electric motors respond fast enough to allow the microprocessor to do the job of keeping the machine in flight. Combustion engines are not able to respond fast enough to the demands of the flight controller to fly with any precision. Also an engine (e. g. gas turbine) would need a small battery if only to act as an energy buffer for scenarios where there are sudden high power draws.

A preferred internal combustion engine to power one or more generators is a gas turbine engine with a high power to weight ratio. Such an engine will desirably run at about the rpm necessary to power the one or more generators. The most preferred commercial engine for one embodiment of the invention weighs only about five pounds yet is capable of producing about 9 kW of power—or is scaled up with comparable values for larger craft [with a power to weight ratio, in kW and pounds, of at least 1:1, preferably at least about 1.5:1 and desirably about 1.8-2.0:1 or more]. Such a device is capable of extending the air time of a conventional multicopter to at least one-two hours.

While a gas turbine engine is preferred, any conventional or to-be-developed high power to weight ratio engine can be utilized. The generator may be a single ac or dc generator or may comprise multiple small ac or dc generators configured in series so that one or perhaps up to four generators may be brought on line electronically (by the controller) as necessary.

According to one aspect of the present invention there is provided an airship comprising: a frame; a plurality of rotors operatively mounted to the frame driven by a plurality of electric motors for providing both lift and horizontal movement of the airship; at least one battery operatively connected to the electric motors to provide electricity for powering the electric motors; an electronic controller for controlling the motors; and a flight time-extending device distinct from the battery, rotors and electric motors.

In a first embodiment of the invention the flight time-extending device includes a central volume of lighter-than-air gas. The central volume (or balloon) is preferably generally ellipsoid in shape, and the airship may comprise a quadcopter. The airship frame may comprise circumferential bands for mounting the rotors to the ellipsoid central volume. The airship may also further comprise a plurality of laterally oriented thrusters.

In a second embodiment of the invention, the flight time-extending device comprises: at least one generator for recharging the at least one battery; and an internal combustion engine with a high power to weight ratio for powering the at least one generator. The internal combustion engine, such as a gas turbine engine, preferably has a power to weight ratio, expressed in kW and pounds, of at least about 1.5:1, and more desirably about 1.8:1 or more. The at least one generator may comprise a generator for each electric motor. The central volume of lighter than air gas, as described above, may also be provided.

In another embodiment of the invention a multicopter (e. g. quadcopter) is provided. The multicopter may comprise: a frame; a plurality of rotors driven by a plurality of electric motors for providing both lift and horizontal movement of the airship frame; at least one battery operatively connected to the electric motors to provide electricity for powering the electric motors; an electronic controller for controlling the electric motors; at least one generator for recharging the at least one battery; and an internal combustion engine with a high power to weight ratio for powering the at least one generator. Preferably the internal combustion engine, which may be a gas turbine engine, has a power to weight ratio, expressed in kW and pounds, of at least about 1.5:1, e. g. about 1.8:1. The at least one generator may comprise a generator for each electric motor.

According to yet another aspect of the invention there is provided a multicopter (e. g. quadcopter) comprising: a frame; a plurality of rotors driven by a plurality of electric motors for providing both lift and horizontal movement of the airship frame; at least one battery operatively connected to the electric motors to provide electricity for powering the electric motors; an electronic controller for controlling the electric motors; and a central volume of lighter-than-air gas. The central volume is preferably generally ellipsoid in shape. The frame may comprise circumferential bands for mounting the rotors to the ellipsoid central volume. A plurality of laterally oriented thrusters may also be provided.

It is the primary object of the present invention to provide an airship (drone, UAV), such as a multicopter, with flight time extended to at least an hour or two by an onboard device. This and other objects of the invention will become clear from the detailed description of the drawings, and from the appended claims.

DETAILED DESCRIPTION OF THE DRAWINGS

Figure 1:
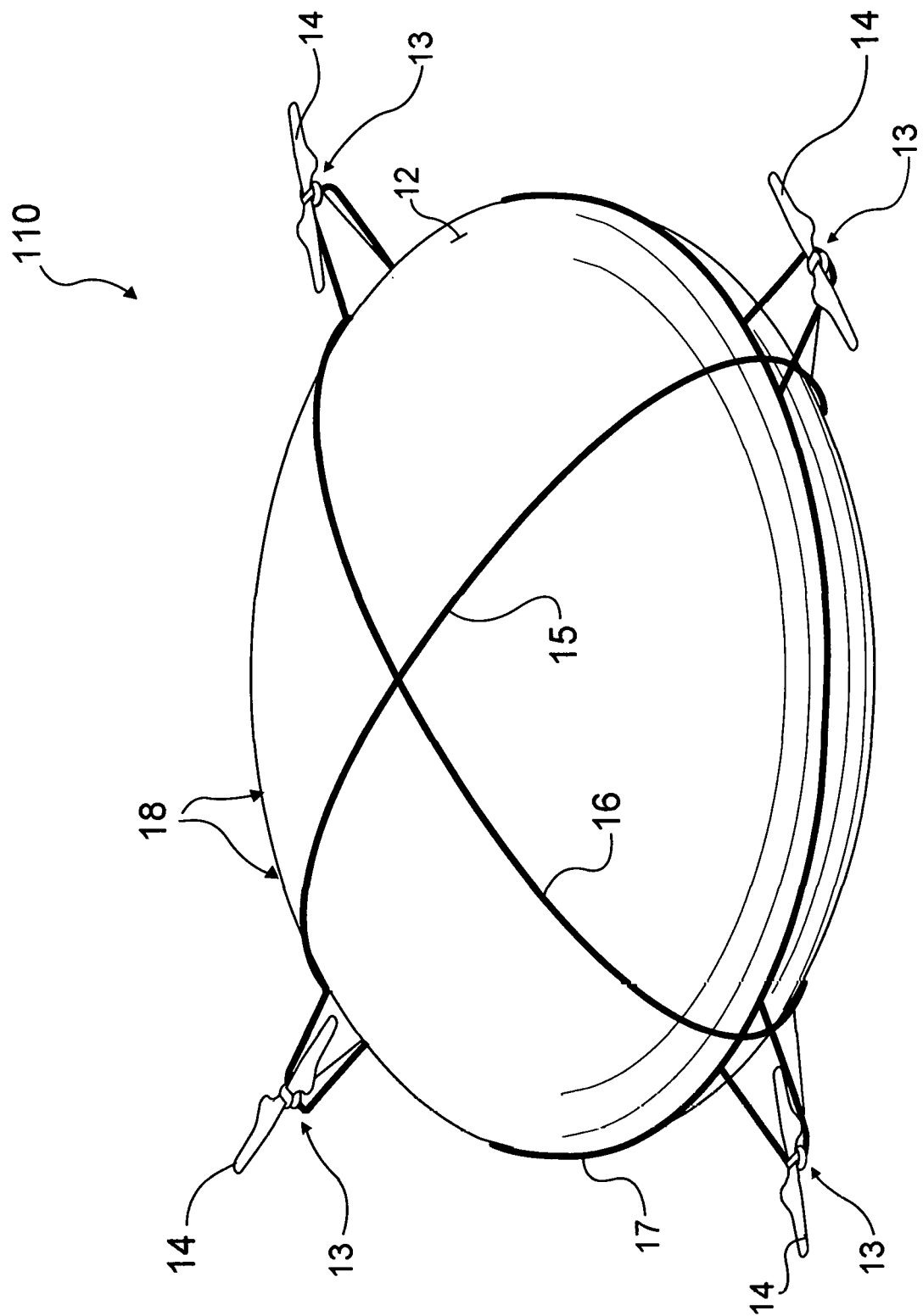
FIG. 1 is a top isometric view of a first exemplary embodiment of a multicopter according to the invention with a lighter than air gas volume for extending flight time.
Figure 3:
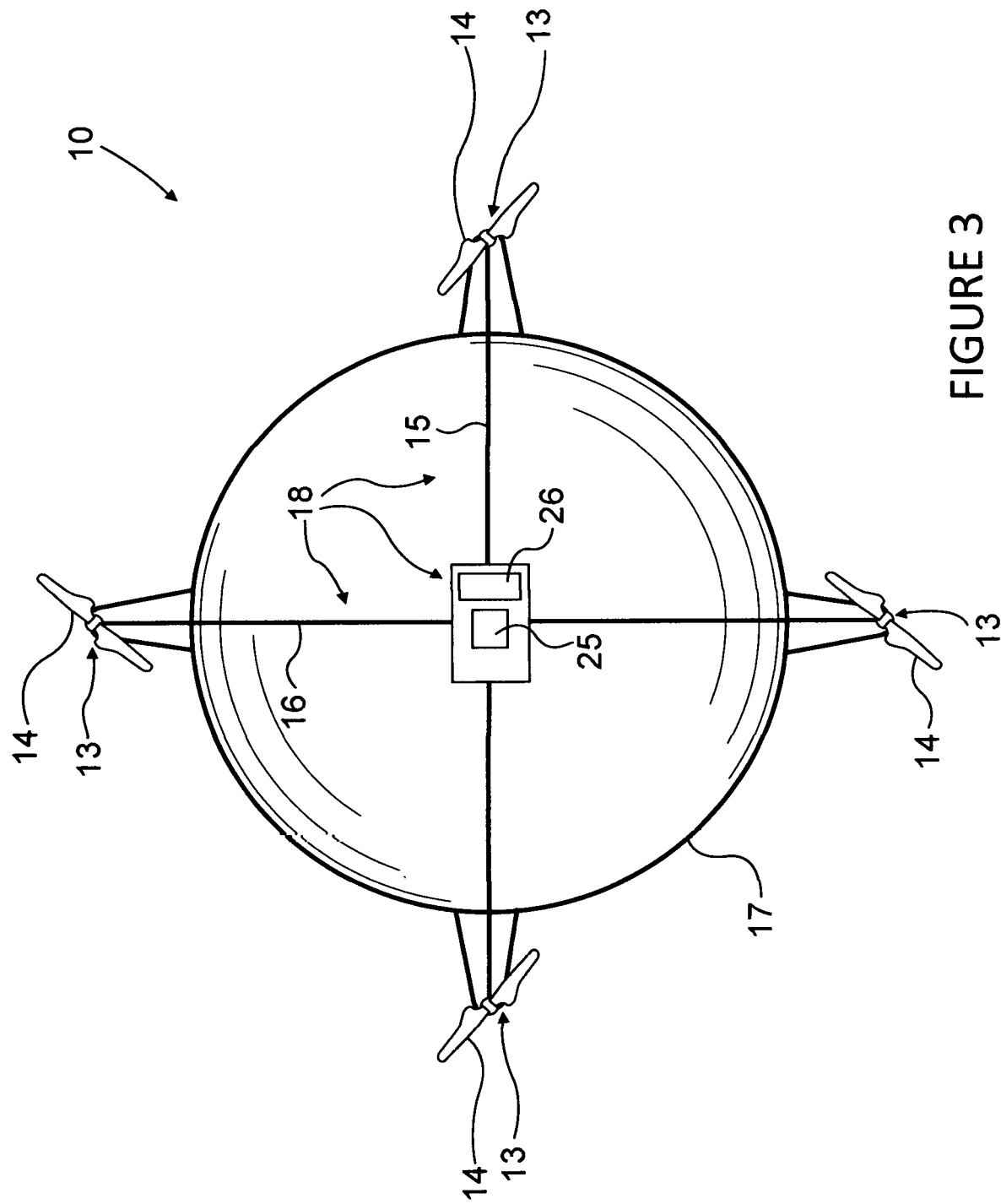
FIG. 3 is a schematic view of the bottom of the multicopter of FIG. 1 schematically showing a battery and electronic controller mounted to the frame of the UAV.

FIG. 1 illustrates a quadcopter 10 with an ellipsoid shaped volume (or "balloon") 12 for retaining the lifting gas in the center thereof. The balloon 12 may be made of any suitable material as long as it is lightweight and capable of containing helium or the like, such as reinforced gas-tight plastic, or materials that airships like dirigibles are typically made of. The lighter-than-air gas such as hydrogen or helium (not shown and not visible in any event) contained within the ellipsoid balloon 12 provides the majority of the lift while the four conventional electric motors 13 driving the conventional propellers 14 (preferably evenly spaced around the periphery of the ellipsoid balloon 12) use standard quadcopter methodology (powered by at least one battery 25, as is conventional, and as seen in FIG. 3) to provide additional lift and to maneuver, including to facilitate descent. This is fundamentally different than a conventional airship or dirigible because in those scenarios none of the lift is intended to be provided by the propulsion system.

Figure 2:
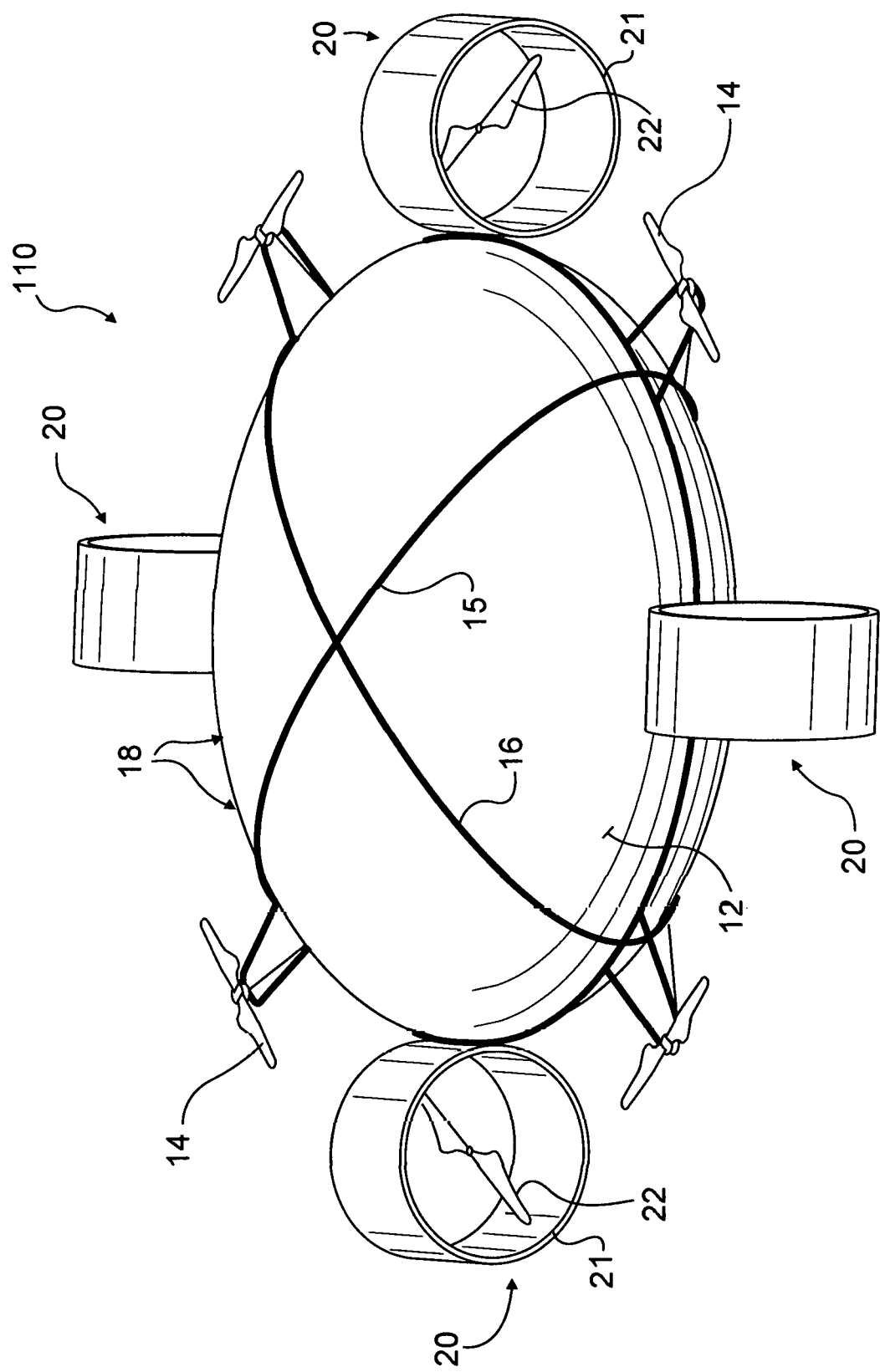
FIG. 2 is a view like that of FIG. 1 with additional structure in the form of laterally oriented thrusters.

As illustrated in FIG. 1, the electric motors/propellers 13, 14 are preferably held in place on the generally ellipsoid-shaped balloon 12 by circumferential metal, carbon-fiber, plastic, or the like bands 15, 16, and 17, which comprise part of the frame—shown generally by reference numeral 18 in FIGS. 1-3—of the quadcopter 10.

The purpose of the preferred ellipsoid shape of the central volume 12 is to minimize the aerodynamic profile from the side to reduce the effect of wind and drag during translational motion. Shapes with a flattened bottom for the central volume 12 may also be used so that the additional lift is provided if there is airflow over and around the airship 10, such as during lateral motion or in the presence of wind.

The quadcopter 10 is capable of a greater payload capacity than a conventional quadcopter (or multicopter) because of the additional lift provided by the lifting-gas within ellipsoid 12. Another benefit is that compared to a standard multicopter, the flight time is significantly greater, due to the fact that most of the time battery energy is only consumed by the motors/rotors 13, 14 during maneuvering and not for lifting. That is the lifting volume 12 comprises a flight time-extending device distinct from the rotors 14 and electric motors 13 (and battery 25—see FIG. 3).

While an ellipsoid shape of the volume 12 is preferred, it can be any shape that would conveniently allow the maneuvering motors/propellers 13, 14 to be mounted to the craft 10 and have relatively low aerodynamic drag. That is, balloon 12 could be generally spherical, cushion-shaped, or donut-shaped, etc. Also while four electric motors/propellers 13, 14 are illustrated in the drawings as few as three or as many as eight (or even more) may be provided, preferably spaced approximately equally around the circumference of the balloon 12.

The amount of lifting gas in balloon 12 used can be varied to produce more or less lift as the situation requires. Sometimes more buoyancy will be desired for example in light wind conditions. More buoyancy will provide longer battery life but may not be desirable in stronger wind conditions. Basically airship 10 could be a lighter than air craft or a neutral buoyancy craft depending on the conditions the craft 10 is being flown in.

FIG. 2 shows a multicopter 110 that is the same as the quadcopter 10 of FIG. 1 with additional structures, with the same structures as in FIG. 1 shown by the same reference numerals. The multicopter 110 includes lifting gas in the central ellipsoid balloon 12 and additionally, employs laterally oriented thrusters shown by reference numeral 20. Shrouds 21 for the propellers 22 of the thrusters 20 are illustrated in FIG. 2 for clarity, but the multicopter 110 may or may not utilize the following features for providing thrust on all rotors:
  Ducted fans
  Turbines
  Propeller shrouds
  Unshrouded propellers
  Variable pitch propellers (for reversing and the direction of thrust and rapidly modulating the amount of thrust)
  Fixed pitch propellers but used with motors which can reverse direction and change speed Advantages of the UAV 110 are that it does not need to pitch or roll the entire craft in order to move horizontally. This maintains a lower drag profile and allows a much quicker response, since the time required to pitch and roll is eliminated. This ability to quickly generate lateral thrusts allows the drone 110 to rapidly compensate for gusts of wind and potentially maintain a very precise position or trajectory, otherwise difficult to achieve with traditional multirotor designs. If more or positive buoyancy is used the reversible thrust motors 20 can be used to force a descent rather than maintain altitude.

Both of the airships 10, 110 provide significant increases in safety and reliability compared to conventional multicopters. The redundancy of the dual systems which provide lift (lifting gas and multirotor) mean that either one can fail without catastrophic results. Should the lifting gas escape ellipsoid 12 for any reason, the airship 10, 110 is still capable of flying and landing like a standard multicopter. Should the motors 13 or the rotors 14 fail, the lifting gas and large surface area of ellipsoid 12 prevent airship 10, 110 from descending too rapidly. The low average density of the airships 10, 110 means that a collision will be significantly less severe than with or for a traditional multicopter of equivalent payload capacity. The four (could be any number) horizontally directed rotors 20 shown in FIG. 2 provide additional redundancy, meaning that even if some rotors fail it is still possible to maneuver safely. One example of such a scenario is if all four of the downwards facing rotors 14 failed, the vehicle 110 could orient itself on its side and provide lift with the two now-downwards facing shrouded propellers 20.

According to the difference in weight of helium and air at standard temperature and pressure, an ellipsoid 12 volume of the shape pictured in FIGS. 1 & 2, with diameters as indicated, could lift:

| | |
|---|---|
| 1 m | ~0.23 kg |
| 2 m | ~1.8 kg |
| 3 m | ~6.3 kg |
| 4 m | ~15 kg |
| 5 m | ~29 kg |

This payload capacity is more than sufficient for practical purposes to carry durable frame and propulsion systems (14-18, 20, 25, and 26) while still leaving enough remaining payload capacity for a wide variety of equipment and other payloads which may be attached to the airships 10, 110 to the bottom thereof (preferably to frame 18), to a structure on the top, or in any other way known in the trade.

FIG. 3 schematically illustrates at least one battery 25 and a conventional electronic controller 26 for controlling the motors 13 in response to signals received from a ground or aircraft operator, mounted at the frame 18. Such structures 25, 26 could be mounted at any conventional location on the multicopter 10, 110, preferably near the horizontal center of gravity thereof, with a view to making sure that the UAV 10, 110 is basically balanced.

Potential applications for the airships 10, 110 include:
Persistent, long endurance surveillance and data collection
Arena sports video coverage
Remote wildlife monitoring
Proximity inspection of difficult to access structures and objects (radio towers, power transmission lines, oil pipelines)
Search and rescue
Wireless data service provision (cellphone and internet coverage)

FIGS. 4-7 illustrate another embodiment of an airship or multicopter 210 according to the invention with a different type of flight time-extending device which can be used in addition to, or (as illustrated in FIGS. 4-7) instead of, the central volume 12. In these figures elements comparable to those in the FIGS. 1-3 embodiment are shown by the same two digit reference numeral preceded by a "2."

Figure 4:
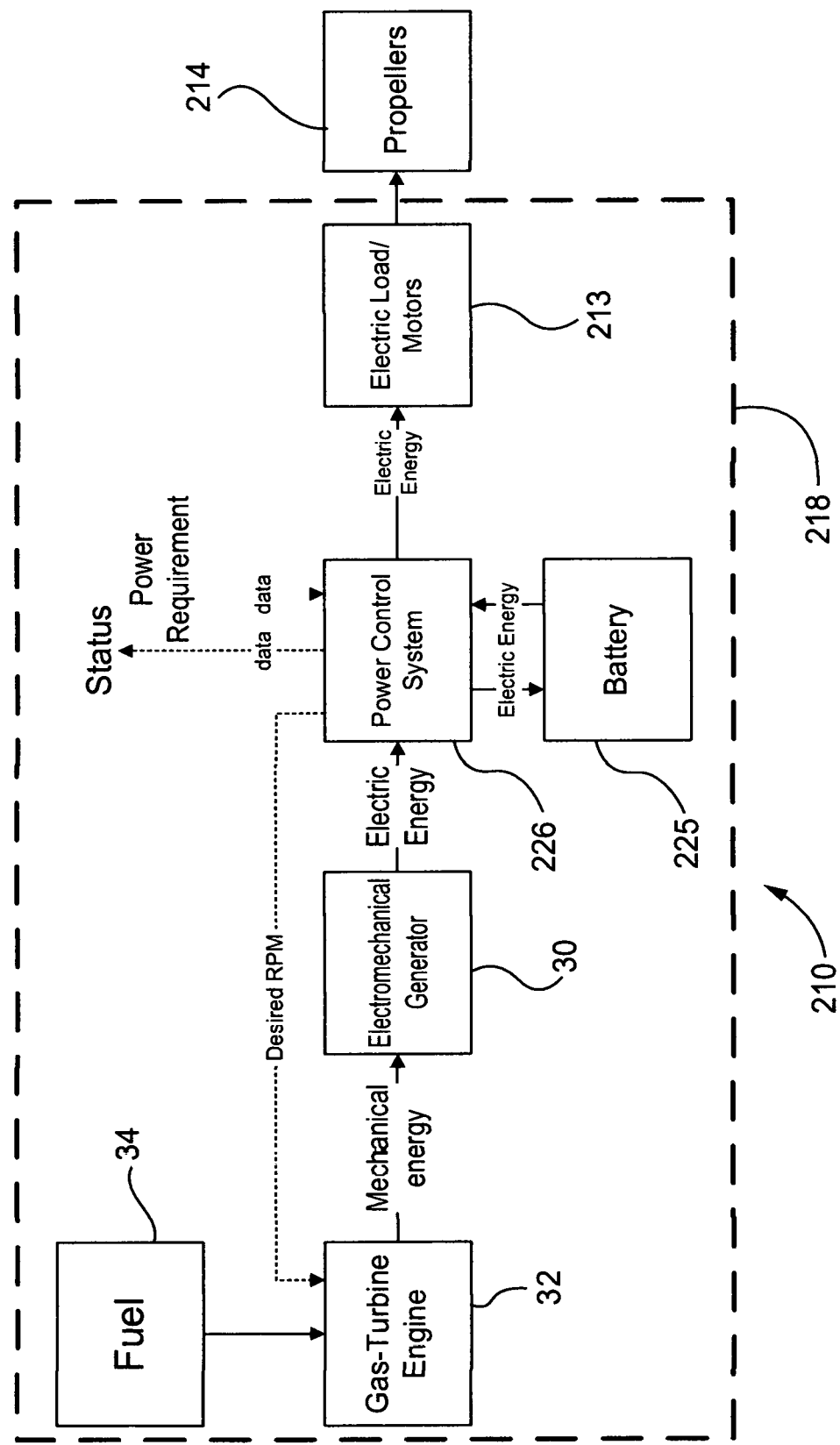
FIG. 4 is block diagram schematically illustrating a second exemplary embodiment of a multicopter according to the invention with a gas turbine engine and generator for extending flight time.

As seen in FIG. 4 the standard components of a multicopter 210, including a frame 218, conventional electric motors 213 for driving conventional propellers 214, at least one conventional battery 225, and a conventional electronic controller 226 for controlling the motors 213 in response to control signals from the ground or aircraft, are illustrated. In this embodiment the flight time-extending device comprises one or more generators 30 operatively connected to the electronic controller 226 for charging the at least one battery 225, and an internal combustion engine 32 with a high power to weight ratio for powering the at least one generator 30.

The internal combustion engine 32 has a power to weight ratio, expressed in kW and pounds, of at least 1:1, preferably at least about 1.5:1, and desirably about 1.8-2.0:1 or more. The engine 32 may be selected from a wide variety of conventional or to be developed internal combustion engines. Preferred for smaller drones 210 is a 5-10 kW turbo shaft gas turbine engine 32 which runs on jet fuel or kerosene from fuel tank 34. The turbine engine 32 will provide enough power to the generator 30 to keep the battery 225 charged to extend flight times to approximately 2 hours as one of the biggest problems that the invention seeks to solve is the power capacity and weight of conventional multicopter batteries.

One particularly desirable gas turbine engine 32 is a commercially available Jet Central Turbines engine which is a single stage centrifugal flow gas turbine engine configured to operate as a turbojet engine. It has a kerosene start, an intelligent control system, a fuel pump, electronic starting gas vale, and electronic fuel vale, weighs only about five pounds and produces about 9 kW of power so that its power to weight ratio (expressed in kW and pounds) is about 1.8:1.

The gas-turbine engine 32 consumes fuel from kerosene or jet fuel tank 34 and generates mechanical energy. The preferred Jet Central turbine 32 has a gear reduction system which provides an output RPM in the range of about 6000 to 8000 RPM.

The electromechanical generator 30 is directly mechanically coupled to the output shaft of the turbine 32 and also rotates at about 6000 to 8000 RPM. This range of RPM allows commonly available, light-weight, electric motors with high power density to be used as the electric generator 30. The voltage-constant of such commonly available motors acting as generator 30 will result in an output voltage that is suitable for charging the battery 225 of a UAV 210.

The electronic controller (power control system) 226 is connected to the electrical output of the generator 30 and is electrically connected to the battery 225. The power control system 226 provides the electrical power output of the entire power plant. A task of the power control system 226 is to maintain the battery 225 in a fully-charged state. The power control system 226 can control the desired RPM of the gas-turbine engine 32, and can control the electrical load that it puts on the generator 30. The power control system 226 monitors the power draw from the electric load (e. g. motors 213) on the system, the voltage of the battery 225, and the power provided by the generator 30. Based on the information from monitoring these, it controls the electrical load on the generator 30 and the desired RPM of the turbine 32 to keep the battery 225 substantially fully charged.

Optionally, an external data input to the power control system 226 may also be used. The external data input gives an estimate of the expected power draw from the power plant. The power control system 226 provides a data output which contains information on the activity of the power control system 226. This includes things such estimates on the state of charge of the battery 225, the power draw from the electrical load, and the power being provided by the generator 30.

Figure 5:
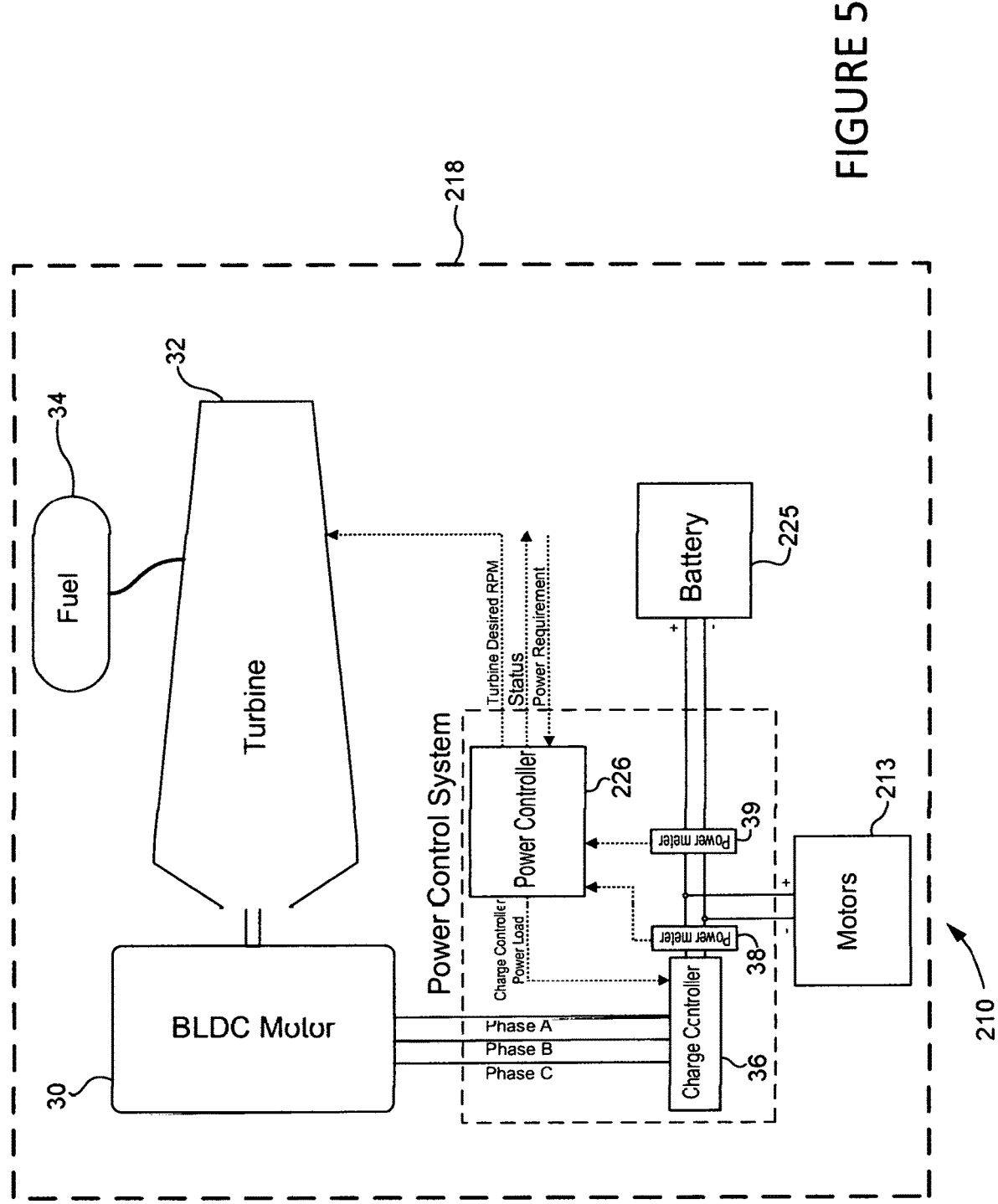
FIGS. 5-7 are block diagrams generally like that of FIG. 4 only showing modifications of the components thereof.
Figure 6:
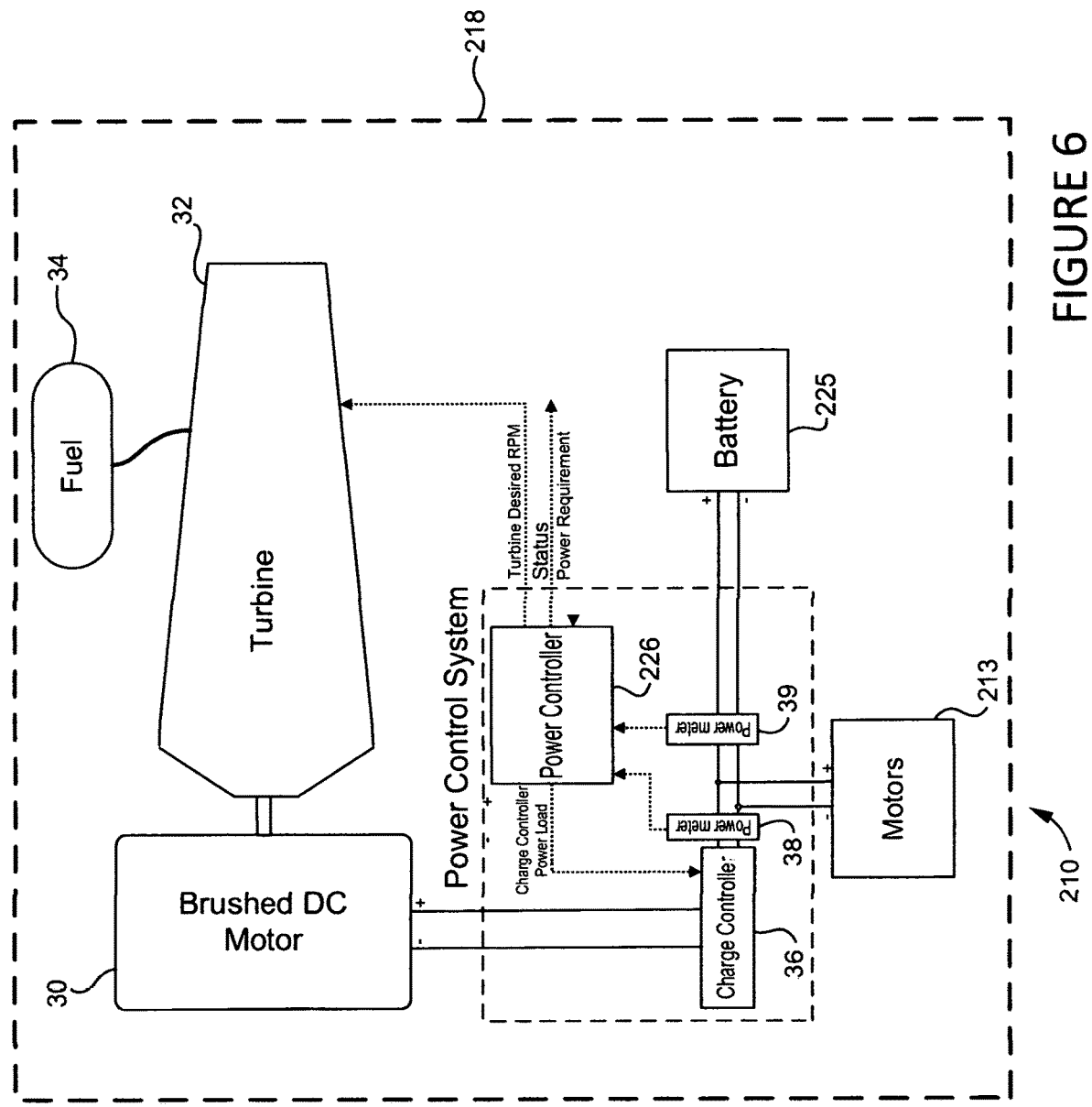
Figure 7:
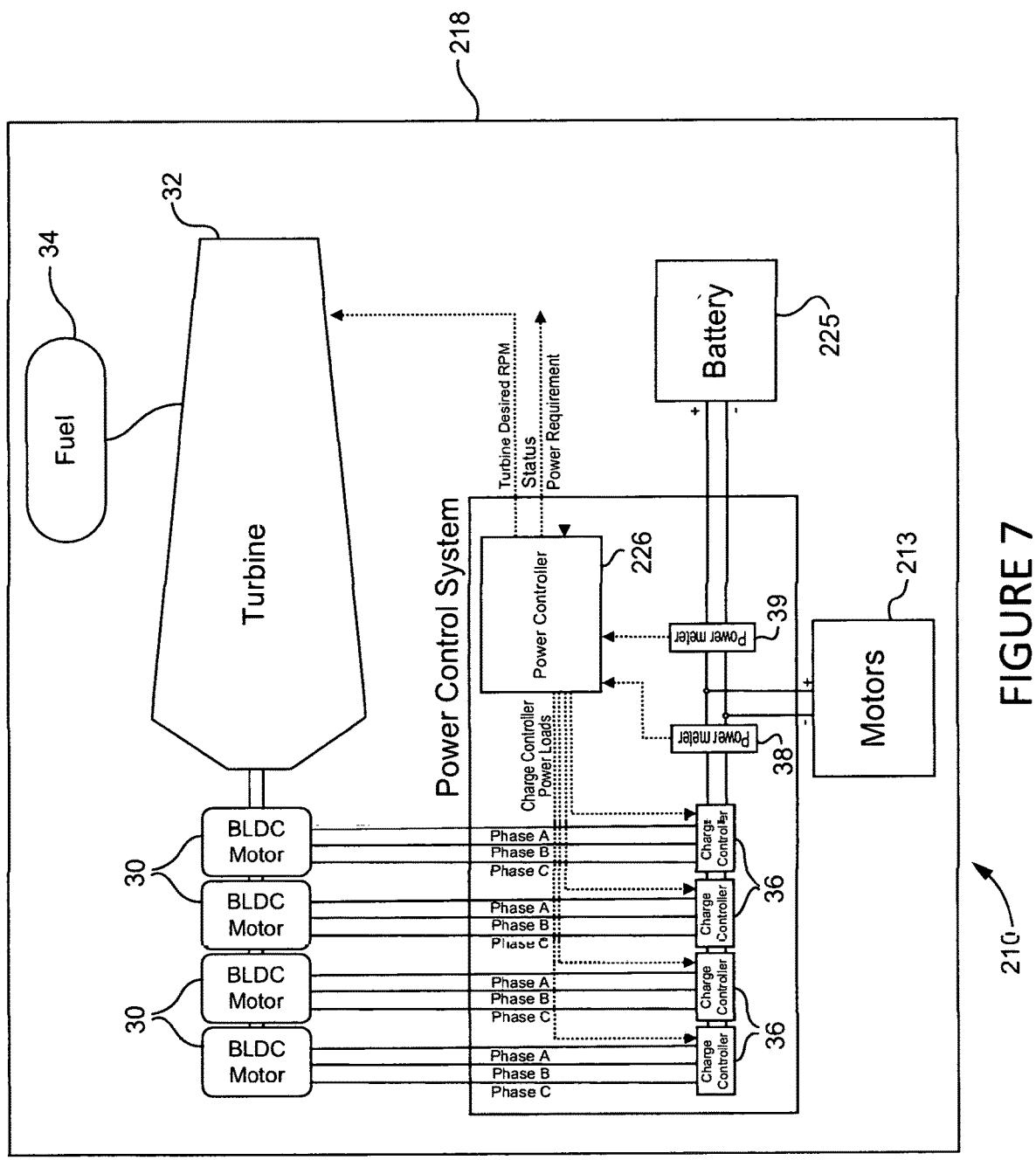

FIGS. 5-7 show other embodiments similar to those of FIG. 4, all having the same reference numerals (if they exist) as in FIG. 4.

For the electromechanical generator 30 either a brushless direct current (BLDC) motor (shown in the FIG. 5 embodiment) or a brushed direct current motor (shown in FIG. 6) may be used. A conventional charge controller 36 suited to the choice of electromechanical generator 30 must be used. The charge controller 36 controls how much electrical energy is harvested from the electromechanical generator 30 based on control input from the power controller 226. The power controller 226 determines how much load is placed on the electromechanical generator 30 through the charge controller 36 based on measurements received from two power meters 38, 39. The power controller 226 increases the load on the electromechanical generator 30 through the charge controller 36 if the energy in the battery 225 falls below a threshold value.

As shown in FIG. 7, multiple smaller motors/generators 30 and charge controllers 36 can be used in place of single units in order to provide redundancy, distribute electrical loads, and simplify the control of power draw.

In all the embodiments of FIGS. 4-7 the components 32, 34, 36, etc., will be mounted on the frame 218 so as to provide good balance.

Using a system such as in FIGS. 4-7 allows the size of the battery/batteries 225 to be reduced while the UAV 210 operates properly. In some cases a battery 225 that is small enough to only act as an energy buffer for scenarios where there are sudden high power draws is all that is necessary.

According to http://batteryuniversity.com/learn/archive/whats_the_best_battery the absolute best energy density of batteries is 160 Wh/kg. Based on the weight of the preferred turbine 32 generous estimates for other components, fuel consumption rate at full power, and conversion efficiency of 50%, the system of FIGS. 4-7 may be said to have an energy density of 150 Wh/kg [that is with 17.6 kg of fuel—enough for one hour usage at full power according to the specifications for the preferred turbine 32]. After burning half of the fuel, the weight is reduced to approximately 9 kg; then the energy density is 211 Wh/kg. This is an advantage over using batteries, because the weight of batteries doesn't decrease as their energy is consumed.

If an energy conversion efficiency (mechanical→electrical energy) of 75% is assumed instead of 50%, these values improve to 225 Wh/kg at take-off weight, and 316 Wh/kg with a half-hour tank 34 of fuel (at full power). Efficiencies of 80 or 90 percent might be possible. Further improvements might also be possible if the weight of the electric motor used as the generator 30 is reduced, e. g. to 10 kg.

The cost comparison between the turbine system of FIGS. 4-7 and batteries providing roughly the same flight time is not completely favorable, but it is within the same range. A battery which can deliver 9 kW for an hour would cost between $4000 and $8000 (2017 USD) depending on some quality and performance characteristics (batteries which can discharge high amounts of power are more expensive). The preferred turbine 32 costs approximately $5000 (2017 USD). Other components needed for the invention (e. g. generator 30, devices 36) could add an additional several thousand dollars, and the cost of fuel will probably be higher than the cost of electricity to charge the batteries. However the possibilities of extending flight times with a turbine system such as illustrated in FIGS. 4-7 has many advantages now, and even more projected ones for the future.

While the invention has been primarily described with relation to drones or the like that are relatively small, in fact the airships according to the invention can be made any size, including large enough to carry a human being or other payload on the order of about 60-120 kg. While it is preferred that the airship according to the invention be controlled by signals from the ground or another flying device, if the airship according to the invention carried a human, the human himself/herself may control the airship using conventional human controls.

While the invention has been herein shown and described in what is presently conceived to be a preferred embodiment thereof, other modifications may be made within the scope of the invention, which scope is to be accorded the broadest interpretation of the appended claims so as to encompass all equivalent structures, systems, and devices. Further all narrower ranges within any broad range given are specifically included herein.

What is claimed is:

1. An airship comprising:
a frame;
a plurality of rotors driven by a plurality of electric motors for providing both lift and horizontal movement of said airship frame;
at least one battery operatively connected to said electric motors to provide electricity for powering said electric motors; an electronic controller for controlling said electric motors; and
a flight time-extending device distinct from said battery, rotors and electric motors, said flight time-extending device including a central volume of lighter-than-air gas;
wherein said frame comprises exterior circumferential bands for mounting said rotors to said central volume; and
wherein said flight time extending device further comprises at least one generator for recharging said at least one battery; and an internal combustion engine with a power to weight ratio of at least about 1.8:1 for powering said at least one generator.

2. An airship as recited in claim 1 wherein said at least one generator comprises a generator for each electric motor.

3. An airship as recited in claim 1 comprising an unmanned quadcopter.

4. An airship as recited in claim 1 wherein said internal combustion engine comprises a gas turbine engine.

5. An airship as recited in claim 4 wherein said gas turbine engine is a single stage centrifugal flow gas turbine engine; and further comprising a gear reduction system operatively connected to said gas turbine engine and which provides an output RPM in the range of about 6000-8000 RPM.

6. A multicopter comprising:
a frame;
a plurality of rotors driven by a plurality of electric motors for providing both lift and horizontal movement of said airship frame;
at least one battery operatively connected to said electric motors to provide electricity for powering said electric motors;
an electronic controller for controlling said electric motors;
at least one generator for recharging said at least one battery; and
an internal combustion engine with a power to weight ratio of at least about 1.5:1, expressed in kW and pounds, for powering said at least one generator.

7. A multicopter as recited in claim 6 wherein said at least one generator comprises a generator for each electric motor.

8. A multicopter as recited in claim 6 wherein said multicopter is unmanned.

9. A multicopter as recited in claim 6 wherein said internal combustion engine comprises a gas turbine engine having a power to weight ratio, expressed in kW and pounds, of at least about 1.8:1.

10. A multicopter as recited in claim 9 wherein said gas turbine engine is a single stage centrifugal flow gas turbine engine; and further comprising a gear reduction system operatively connected to said gas turbine engine and which provides an output RPM in the range of about 6000-8000 RPM.

11. A multicopter as recited in claim 9 wherein said at least one generator comprises a generator for each electric motor.

* * * * *